US 11,979,036 B2

(12) United States Patent
Kavimandan et al.

(10) Patent No.: US 11,979,036 B2
(45) Date of Patent: May 7, 2024

(54) SYSTEM AND METHOD OF WIRELESS POWER SUPPLY

(71) Applicant: UT Battelle, LLC, Oak Ridge, TN (US)

(72) Inventors: Utkarsh D. Kavimandan, Oak Ridge, TN (US); Veda P. Galigekere, Oak Ridge, TN (US); Burak Ozpineci, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 17/563,784

(22) Filed: Dec. 28, 2021

(65) Prior Publication Data

US 2022/0209587 A1 Jun. 30, 2022

Related U.S. Application Data

(60) Provisional application No. 63/132,125, filed on Dec. 30, 2020.

(51) Int. Cl.
*H02J 50/90* (2016.01)
*H02J 7/00* (2006.01)
*H02J 50/10* (2016.01)

(52) U.S. Cl.
CPC ........... *H02J 50/90* (2016.02); *H02J 7/0047* (2013.01); *H02J 7/007188* (2020.01); *H02J 50/10* (2016.02); *H02J 2207/20* (2020.01)

(58) Field of Classification Search
None
See application file for complete search history.

(56) References Cited

U.S. PATENT DOCUMENTS

| 2010/0052431 A1* | 3/2010 | Mita ................. H02J 50/12 307/104 |
| 2017/0305280 A1* | 10/2017 | Weidner ............... H02J 50/12 |
| 2017/0373609 A1* | 12/2017 | Perreault ............. H02M 1/083 |

OTHER PUBLICATIONS

Patil, D. et al., "Wireless Power Transfer for Vehicular Applications: Overview and Challenges", IEEE Transactions on Transportation Electrification, vol. 4, No. 1, Mar. 2018, pp. 3-37.
Nagendra, G.R. et al., "Detection of EVs on IPT Highways", IEEE Journal of Emerging and Selected Topics in Power Electronics, vol. 2, No. 3, Sep. 2014, pp. 584-597.
Hasan, N. et al., "A Novel Position Sensorless Power Transfer Control of Lumped Coil-Based In-Motion Wireless Power Transfer Systems", IEEE, 2015, pp. 1-8.

* cited by examiner

*Primary Examiner* — Daniel Kessie
(74) *Attorney, Agent, or Firm* — Warner Norcross + Judd LLP

(57) ABSTRACT

A system and method for sensorless coil detection that exploits a dead-time effect in a WPT inverter as an indicator of presence of a receiver. In one embodiment, a system described herein may be configured to detect arrival of a moving receiver prior to alignment of the moving receiver with the transmitter for power transmission.

7 Claims, 8 Drawing Sheets (b)

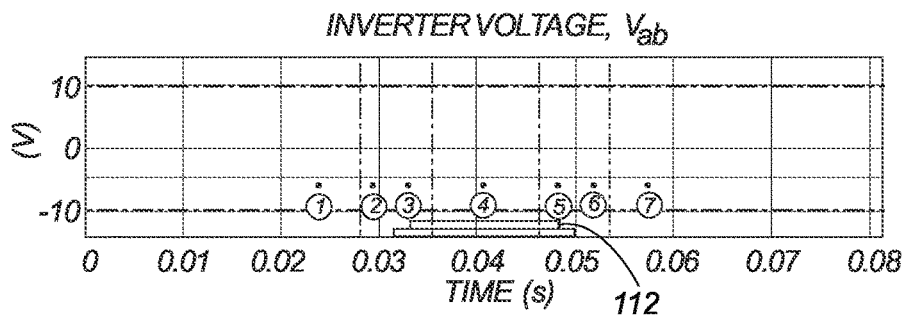
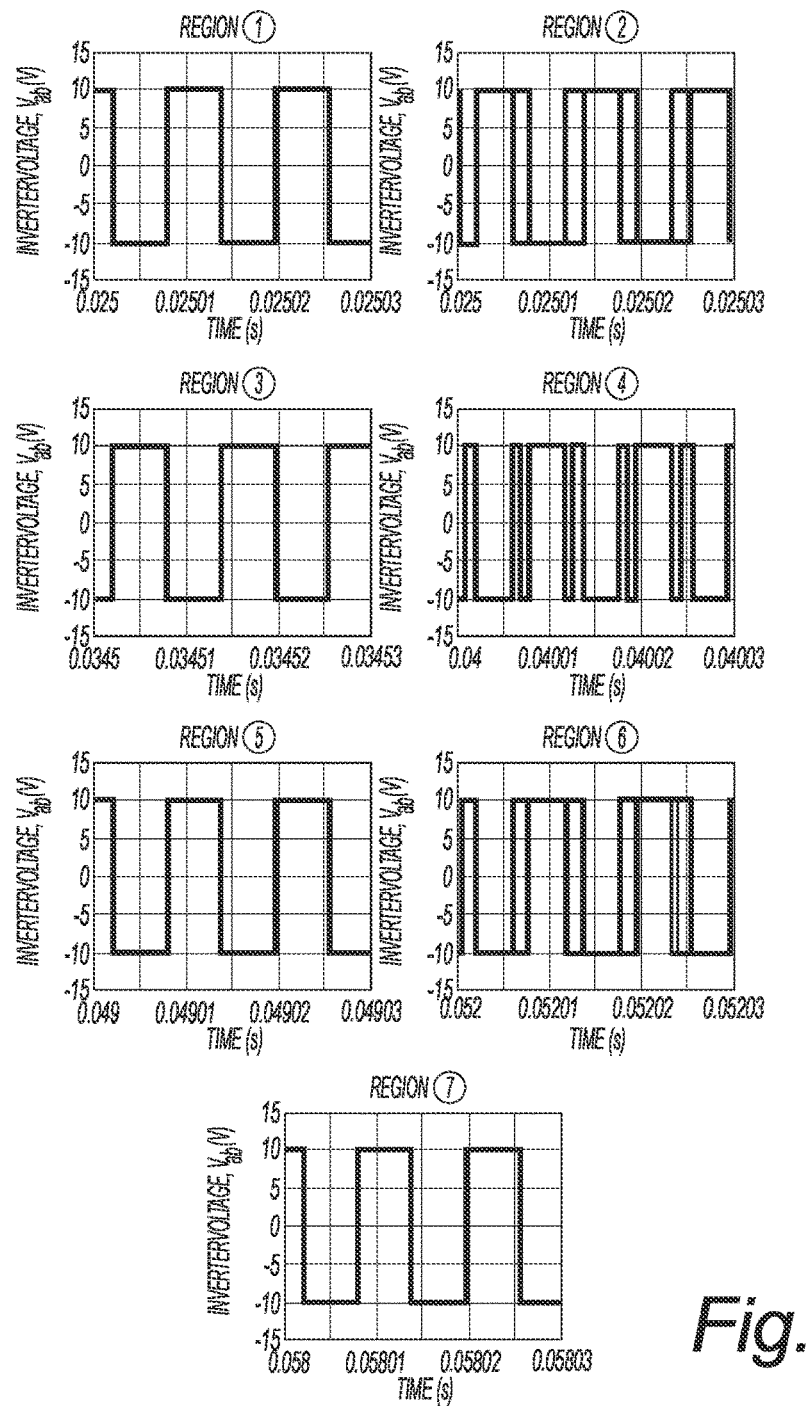
Fig. 6A
Fig. 6B

SYSTEM AND METHOD OF WIRELESS POWER SUPPLY

This invention was made with government support under Contract No. DE-AC05-00OR22725 awarded by the U.S. Department of Energy. The government has certain rights in the invention.

FIELD OF INVENTION

The present disclosure relates to the field of transferring power wirelessly, and more particularly to presence detection with respect to a wireless power receiver relative to a wireless power transmitter.

BACKGROUND

Conventional wireless power transfer (WPT) systems can alleviate challenges possessed by conventional plug-in chargers and further facilitate the adaptation of electric vehicles (EVs). Moreover, the concept of dynamic WPT (DWPT) or in-motion charging of EVs can reduce the charge anxiety among EV consumers and also significantly reduce the battery size of the EV.

A significant barrier to deployment of DWPT systems is adherence to the International Commission on Non-Ionizing Radiation Protection guidelines for electromagnetic-field emissions.

Another barrier to deployment of DWPT systems is standby losses. Conventionally, a reduction in standby losses can be achieved by energizing transmitter pads sequentially along the travel path of the EV. In an effort to reduce the standby losses, conventional efforts selectively activate transmitter pads by relying on communication to detect the EV traveling along the WPT track. For instance, dedicated short-range communication (DSRC) technology has been implemented in conventional systems for EV detection. The latency rate of the DSRC technology enables transfer of power as well as selective activation of the transmitter pads in an effort to avoid standby loses; however, the implementation cost of DSRC is considerably high. Additional drawbacks of DSRC implementations are that 1) implementation cost may vary according to the deployment site, 2) the radio frequency signals decay exponentially as the distance increases (e.g., signal attenuation), and 3) they provide for inaccurate detection if the communication link fails.

An alternative conventional detection system relies on sensing coils to detect presence of the EV for selective activation of the transmitter pads. This reliance on a sensing coil introduces another coil in addition to the transmitter pad, and therefore increases the complexity and cost of the system. In other words, this technique requires additional equipment or auxiliary components to energize the sensing coils. Additionally, the adoption of sensing coils may not be feasible in segmented track configurations because the excess number of components increases the implementation cost. Furthermore, the adoption of sensing coils in the long track configuration may require a strategic arrangement, potentially many coils, to detect the EV entering from the side lane.

There are conventional detection systems that operate without a sensor coil by periodically supplying power to the transmitter pad that is sufficient to charge the EV. During the supply of such power, the mutual inductance profile of the transmitter and receiver pads is monitored to presence of the EV. If presence is detected, the supply of power to the transmitter pad is maintained, and if no presence is detected, the supply of power to the transmitter pad is discontinued. In this conventional approach, the periodic supply of power to the transmitter pad at a level sufficient to charge the EV is considered an acceptable standby loss.

SUMMARY

In general, one innovative aspect of the subject matter described herein can be embodied in an off-board transmitter for wirelessly providing AC power to an electric vehicle (EV) or a plug-in electric vehicle (PEV). The transmitter may include a DC voltage source and an inverter. The inverter may be configured to receive a DC voltage from the DC voltage source, and convert the DC voltage to a high-frequency AC voltage. The transmitter may include a primary coil configured to wirelessly transmit the high-frequency AC voltage and a notch detector.

The notch detector may be configured to sense the high-frequency AC voltage as a sensing signal, and detect notches in the sensing signal caused by varying coupling between the primary coil and a pick-up coil of the EV/PEV. The pick-up coil may be configured to receive the high-frequency AC voltage when the primary coil and the pick-up coil are disposed adjacent to each other.

The transmitter may include driver circuitry configured to apply first driving signals to the inverter such that a first deadtime is provided between complementary switching instances of the inverter phase legs, and set a level of operating frequency, provided by the drive signal, to a first level, and set a level of the DC voltage, provided by the DC voltage source to the inverter, to a first level.

The foregoing and other embodiments can each optionally include one or more of the following features, alone or in combination. In particular, one embodiment includes all the following features in combination.

In some embodiments, the notch detector may include an operational amplifier.

In some embodiments, the driver circuitry may be configured to monitor the notch detector to determine whether notches have been detected, and if so, to A) generate second driving signals corresponding to a second deadtime shorter than the first deadtime, and set the level of the frequency to a second level, and set the level of the DC voltage to a second level larger than the first level, and B) after a predetermined time interval, regenerate the first driving signals, and reset the level of the DC voltage to the first level.

In some embodiments, a frequency of the fundamental component of the high-frequency AC voltage may be 22 kHz or 85 kHz.

In some embodiments, the driver circuitry may include a microcontroller, an ASIC, or an FPGA.

In general, one innovative aspect of the subject matter described herein can be embodied in a wireless power transfer (WPT) system for wirelessly providing AC power to an electric vehicle or a plug-in electric vehicle. The WPT system may include an off-board transmitter and an on-board receiver comprising a pick-up coil.

The foregoing and other embodiments can each optionally include one or more of the following features, alone or in combination. In particular, one embodiment includes all the following features in combination.

In some embodiments, the WPT system power rating is 100 kW, and the second level of the DC voltage may be in a voltage range of 350-800 V.

In some embodiments, the first level of the DC voltage may be in a voltage range of 5-50V.

In general, one innovative aspect of the subject matter described herein can be embodied in a wireless power transmitter operable to transmit power wirelessly to a wireless power receiver. The wireless power transmitter may include a transmitter configured to transfer power inductively to a receiver of the wireless power receiver, and switching circuitry operably coupled to the transmitter. The switching circuitry may be configured to selectively supply power to the transmitter from a power source, and may be operable between a deadtime mode and an active mode. The wireless power transmitter may include a detector configured to generate a detection output indicative of presence of the receiver in proximity to the transmitter, where the detection output is based on a change in a reflected impedance of the transmitter during the deadtime mode.

The foregoing and other embodiments can each optionally include one or more of the following features, alone or in combination. In particular, one embodiment includes all the following features in combination.

In some embodiments, the switching circuitry is an H-bridge circuit having first and second phase legs. The first and second phase legs may be operable in a complementary manner to supply power to the transmitter, and the first and second phase legs may include switches operable to control supply of power from the power source to the transmitter. The switches of the first and second phase legs may be inactive in the deadtime mode.

In some embodiments, each of the switches of the first and second phase legs may include a discrete switch and a body diode, where the discrete switches are inactive in the deadtime mode, where the body diodes are operable, in the deadtime mode, to conduct current in response to a change in reflected impedance of the transmitter that is indicative of presence of the receiver in proximity to the transmitter.

In some embodiments, the detector may be operable to determine the receiver is present in proximity to the transmitter in response to detection of a notch during the deadtime mode, where the notch may be indicative of a change in the reflected impedance of the transmitter.

In some embodiments, the wireless power transmitter may be configured to operate in a low power mode and a power transfer mode. The wireless power transmitter may be operable to transition from the low power mode to the power transfer mode in response to the detection output being indicative of a change in presence of the receiver in proximity to the transmitter.

In some embodiments, in the low power mode, at least one of the power source and the switching circuitry may be controlled to supply detection power to the transmitter. In the power transfer mode, at least one of the power source and the switching circuitry may be controlled to supply power to the transmitter sufficient to operate the wireless power receiver.

In some embodiments, the detector may be operable to detect presence of a wireless power receiver in motion, where the detection output may be indicative of the receiver being present in proximity to the transmitter and approaching alignment for power transfer from the transmitter to the receiver.

In general, one innovative aspect of the subject matter described herein can be embodied in a wireless power transmitter operable to transmit power wirelessly to a moving wireless power receiver. The wireless power transmitter may include a transmitter configured to transfer power inductively to a receiver of the moving wireless power receiver, and switching circuitry operably coupled to the transmitter. The switching circuitry may be configured to selectively supply power to the transmitter from a power source.

The wireless power transmitter may include a detector configured to generate a detection output indicative of presence of the receiver moving into proximity to the transmitter and approaching alignment for power transfer from the transmitter to the receiver. The detection output may be based on a change in a reflected impedance of the transmitter.

The foregoing and other embodiments can each optionally include one or more of the following features, alone or in combination. In particular, one embodiment includes all the following features in combination.

In some embodiments, the detection output may be indicative of presence of the receiver prior to alignment of the receiver and the transmitter.

In some embodiments, the switching circuitry may be operable between a deadtime mode and an active mode, and where the detector may be operable to generate the detection output during the deadtime mode of the switching circuitry.

In some embodiments, the detector may be operable to detect presence of a notch during the deadtime mode of the switching circuitry.

In some embodiments, the wireless power transmitter may be configured to operate in a low power mode and a power transfer mode. The wireless power transmitter may be operable to transition from the low power mode to the power transfer mode in response to the detection output being indicative of a change in presence of the receiver in proximity to the transmitter.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components. Any reference to claim elements as "at least one of X, Y and Z" is meant to include any one of X, Y or Z individually, and any combination of X, Y and Z, for example, X, Y, Z; X, Y; X, Z; and Y, Z.

BRIEF DESCRIPTION OF THE DRAWINGS

FIG. 6A shows an output voltage of switching circuitry in one embodiment according to the present disclosure.

FIG. 6B shows enlarged views for several regions identified in FIG. 6A.

DESCRIPTION

The present disclosure is directed to a system and method for sensorless coil detection that exploits a dead-time effect in a WPT inverter as an indicator of presence of a receiver. In one embodiment, a system described herein may be configured to detect arrival of a moving receiver prior to alignment of the moving receiver with the transmitter for power transmission. In other words, the system may be configured to detect the moving receiver is approaching alignment with the transmitter for power transmission prior to actual alignment. This way, the system can begin transferring power to the moving receiver sooner than otherwise would occur if presence were detected only while the receiver is actually aligned for power transfer. The receiver detection aspects described herein can be accomplished at low power operation.

Figure 2:
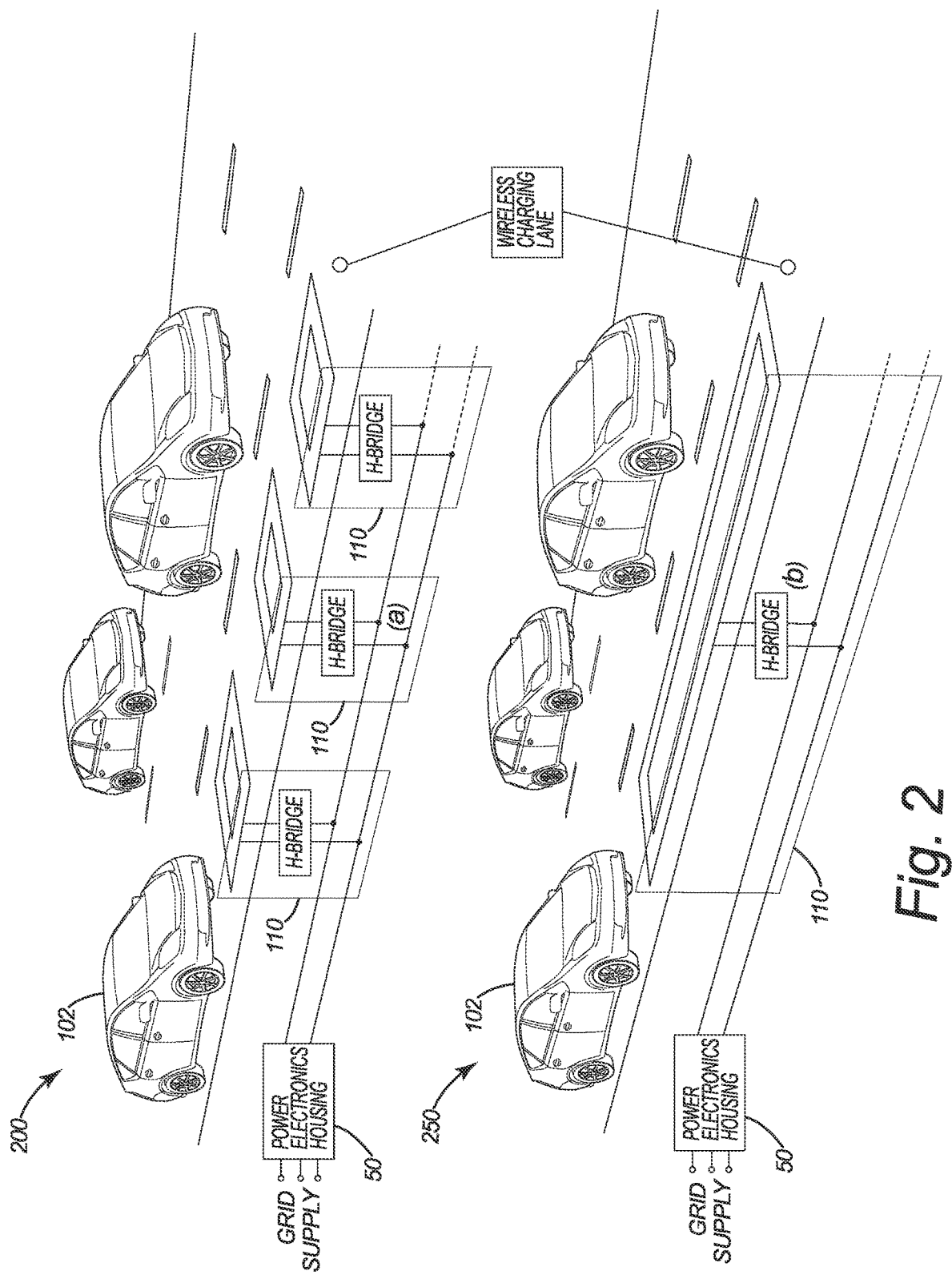
FIG. 2 shows first and second track configurations in one embodiment according to the present disclosure.

A segmented track configuration 200 and a long track configuration 250 are depicted in FIG. 2. The choice of which track configurations is implemented in practice depends on a variety of factors. A wireless power transfer system 100, including a wireless power transmitter 110, may be incorporated into the track configuration 200, 250. Such a wireless power transmitter 110 is shown in the track configurations 200, 250 in the illustrated embodiments of FIG. 2.

In one embodiment, detection of a receiver can be conducted by supplying power to a transmitter (e.g., a primary coil) at low power and by monitoring a characteristic of power supplied to the transmitter. Detection in this manner may provide a quick response time, which facilitates detection of fast traveling EVs. The EV, including a moving receiver, may travel across the transmitter pad for a potential charging duration that is a function of the transmitter size, the receiver size, and the speed of the moving receiver. For instance, if the transmitter and receiver pads are 1 m in length and the EV travels at 70 mph (or 112.6 km/h or 31.2 m/s), then the EV may cover the transmitter pad distance in 32 ms, which corresponds to the potential charging duration in this example. The WPT system 100 in accordance with one embodiment may be operable to detect the receiver in a time faster than the potential charging duration.

Optionally, the receiver may be detected prior to the start of the potential power transfer duration (e.g., a potential charging duration) within a pre-alignment duration that immediately precedes the start of the potential charging duration. For example, the receiver may be detected within 5 ms prior to the start of the potential charging duration during which the moving receiver and the transmitter are aligned for power transfer.

A system and method in one embodiment according to the present disclosure may detect presence of a receiver without dedicated sensing coils, reduction component count, and expense. The system and method may provide low power operation to reduce standby losses, and potentially avoids reliance on communication from the secondary-side for detection purposes. The system and method can be implemented for a variety of coil configurations and compensation arrangements. The system and method may enable detection in track configurations with respect to receivers and EVs that enter from the side-lane. The system and method may be useful for detection purposes in fields outside the realm of vehicles, such as consumer electronics or biomedical applications.

I. Overview

Figure 1:
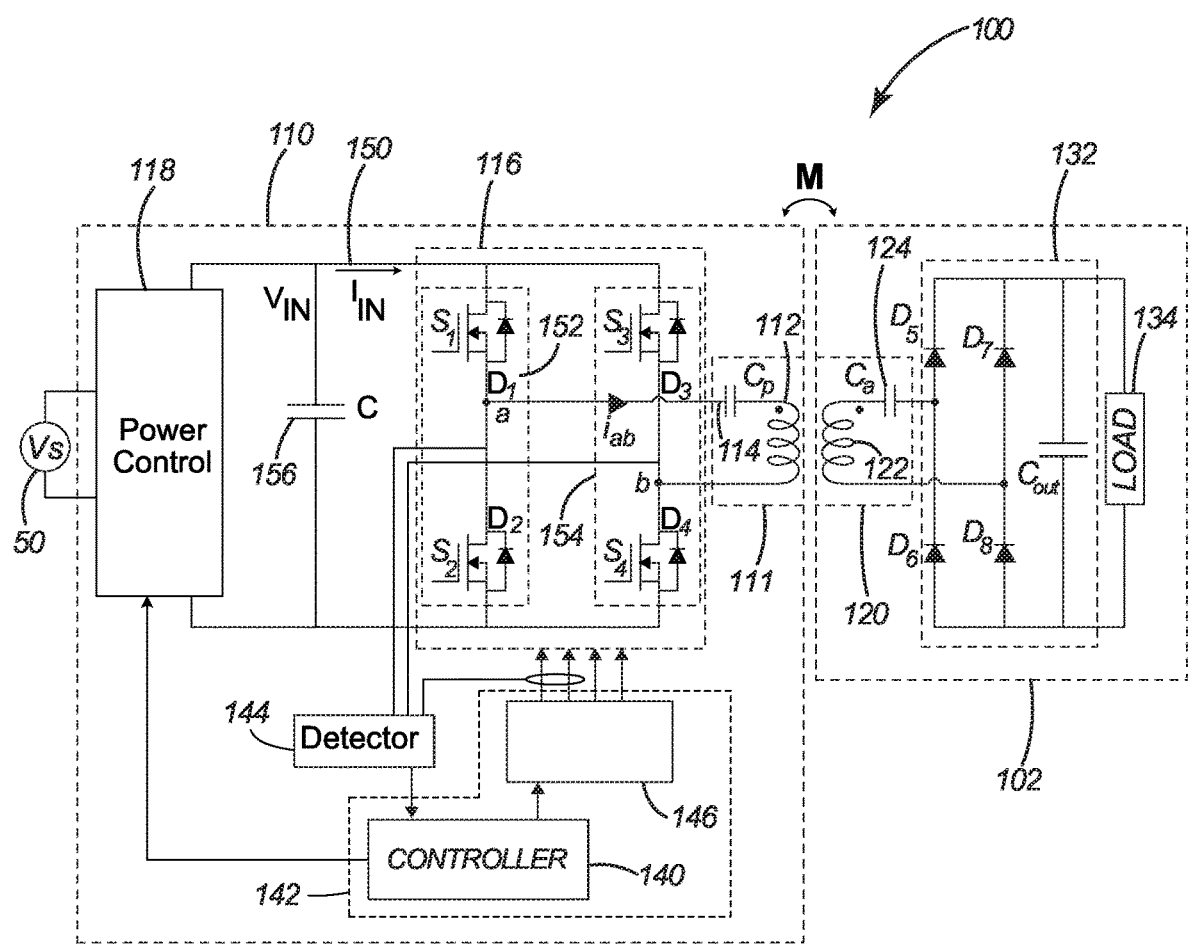
FIG. 1 shows a system in one embodiment according to the present disclosure.

A wireless power transfer (WPT) system is shown in accordance with one embodiment in FIG. 1, and generally designated 100. As discussed herein, the WPT system 100 may be configured differently than the configuration depicted in the illustrated embodiment. For instance, the WPT system 100 in the illustrated embodiment is a series-series compensated system; however, the WPT system 100 may be configured differently, such as a series-parallel compensated system (or parallel-parallel or parallel-series). As another example, the WPT system 100 may be configurable for three-phase operation. Examples of three phase topologies are described in U.S. Appl. No. 17,127,197, entitled WIRELESS POWER SYSTEM, filed Dec. 18, 2020, to Asa et al.—the disclosure of which is hereby incorporated by reference in its entirety.

The input voltage of the WPT system 100 may be provided in the form of an AC power source 50, and may be supplied by power control circuitry 118. The power control circuitry 118 may supply DC power 150 based on the power received from an AC power source 50. In the illustrated embodiment, and as depicted in FIG. 2, the AC power source 50 corresponds to grid power. The power control circuitry 118 may include rectification circuitry (passive or active). The power control circuitry 118 may be configured in one embodiment to vary power, or a characteristic thereof, that is supplied to switching circuitry 116 (also described herein as an inverter). For instance, the power control circuitry 118 may be operable between an operating mode and a low power mode. The low power mode may correspond to a reduced DC voltage of the DC power 150 relative to the DC voltage of the DC power 150 supplied in the operating mode.

In case of a single-phase or unbalanced 3-phase system, the DC power 150 may be contaminated with ripple voltage at twice the frequency of the grid. This ripple may be the result of rectification of the AC power source 50 by the power control circuitry 118 to provide the DC power 50, such as by full wave rectification of the AC power source 50 and filtering with one or more DC link capacitors 156. The ripple on the DC link or DC source 50 may be reduced by increasing the capacitance of the DC link capacitor 156.

A WPT system 100 in accordance with one embodiment may include a detector 144 operable to output a detection signal to drive circuitry 142 of the wireless power transmitter 110. The detection signal may be indicative of presence of a receiver 122 in proximity to a transmitter 112 of the wireless power transmitter 110 or indicative of the receiver 122 approaching alignment with the transmitter 112 for power transfer. Proximity may be detected with respect to the receiver 122 prior to the receiver 122 being both proximal to and aligned with the transmitter 112.

The drive circuitry 142, as described herein, may determine to transition from the low-power mode to the operating mode for transmitting power to the receiver 122 sufficient to operate circuitry coupled to the receiver 122 in accordance with operating parameters of such circuitry. Such operation may include charging a battery with power received from the wireless power transmitter 110.

It is noted that, in the low-power mode, a small amount of power may be received by the receiver 122—this small amount of power is insufficient to operate circuitry coupled to the receiver 122 in accordance with the operating parameters of such circuitry. As a result, the negligible amount of power received by the receiver 122 from the wireless power transmitter 110, while operating in the low-power mode, is not considered to be operating power for powering the receiver 122.

The WPT system 100 in the illustrated embodiment of FIG. 1 includes a remote device 102 and a wireless power supply 110 configured to transmit wireless power to the remote device 102. For purposes of disclosure, the remote device 102 is described herein as a vehicle or EV; however, the remote device 102 or one or more components thereof may be incorporated into any type of apparatus or device, including, for instance, a mobile phone or table top appliance.

Additional examples of applications include a vehicle provided as an electric vehicle, a plug-in hybrid electric vehicle, or an electric/plug-in hybrid combat vehicle. Further example applications can relate to energy storage provided in a variety of forms, including a stationary or mobile energy storage system, a low/high voltage battery charger being a cell phone, a laptop, a tablet, a power tool, a gardening tool, a handheld vacuum cleaner, a kitchen gadget, any type of battery charger or adapter, chargers for portable electronics (including cameras, laptops, and cell phones), house-hold appliances with grid isolation requirements, air mobility vehicles (such as electric/hybrid propulsion aircraft, drones, UAVs, and satellites), laser applications, LEDs, single-phase or three-phase grid systems with medium or low grid voltage networks, fuel cell, solar, or wind turbine renewable energy conversion systems, microturbines (e.g., in grid connected applications), and High Voltage (HV) systems.

The remote device 102 in the illustrated embodiment includes a wireless power receiver 122 (e.g., a receiver) separable from and capable of coupling with a transmitter 112 of the wireless power supply 110. The wireless power supply 110 may be considered an off-board module. One or more aspects of the remote device 102, as described herein, may be considered an on-board module. For instance, receiver circuitry 120, including the receiver 122, a capacitor 124, and rectification circuitry 132 may form at least part of an on-board module of a vehicle. The receiver circuitry 120 may form part of an energy storage charging system of the vehicle, where a load 134 is a battery of the vehicle.

The rectification circuitry 132 may include a plurality of rectification diodes D5, D6, D7, D8 operable for full wave rectification (or half wave rectification if configured different from the illustrated embodiment) along with a filter capacitor $C_{out}$ operable to filter ripple from the output of the rectification diodes D5, D6, D7, D8.

The remote device 102 includes a load 134 operable to use power received wirelessly from the wireless power supply 110. For instance, the wireless power receiver 122 may be operably coupled to the load 134 to provide power thereto. The load 134 may include an on-board charge operable to charge a battery. The receiver 122 in the illustrated embodiment is a secondary coil or a pick-up coil; however, it is to be understood that the present disclosure is not so limited.

In the illustrated embodiment of FIG. 1, the wireless power supply 110 may include transmitter circuitry 111 having the transmitter 112 (e.g., a primary coil) operable to couple with the receiver 122 for wirelessly transferring power, such as by magnetic coupling or inductive coupling. As described herein, the transmitter 112 and the receiver 122 may vary depending on the application, and are not limited to a single primary coil or a single secondary coil.

The wireless power supply 110 may be operable to receive power from an AC power source 50. In one embodiment, the AC power source 50 may be provided via grid power or utility power, and may be single phase or three-phase depending on the application as described herein.

The wireless power supply 110 in the illustrated embodiment includes driver circuitry 142 including a controller 140 and switch control circuitry 146 operably coupled to the controller 140. The driver circuitry 142 may be operably coupled to the detector 144, which may be configured to detect a characteristic of power with respect to the power supplied to the transmitter 112, such as the voltage $V_{ab}$ applied to the transmitter 112.

The detector 144 is shown separate from the driver circuitry 142, but may be integral therewith in one embodiment. The switch control circuitry 146 may pass through conductors that provide a direct connection between the switching circuitry 116 and the controller 140. Alternatively, the switch control circuitry 146 may include a multiplexor or signal conditioning circuitry, or both, to translate output from the controller 140 to direct operation of the switching circuitry 116.

The switching circuitry 116 in the illustrated embodiment includes an H-bridge inverter configuration (e.g., a full bridge) capable with first, second, third, and fourth switches S1, S2, S3, S4 capable of operating in conjunction with each other to provide input power to the transmitter 112. The switches S1, S2, S3, S4 may be MOSFETs or any other type of switch capable of selectively supplying power to the transmitter 112. The switches S1, S2, S3, S4 may be operably coupled respectively to diodes D1, D2, D3, D4, which may be integral body diodes of the switches S1, S2, S3, S4. As described herein, current flow through the diodes D1, D2, D3, D4 in the low-power mode in accordance with detection criteria may be indicative of the receiver 122 approaching or being in alignment with the transmitter 112.

The switches S1, S2, S3, S4 may be conceptualized according to first and second phase legs 152, 154 operable in a complementary manner to supply and receive power with respect to the transmitter 112. The first and second switches S1, S2 may define the first phase leg 152, and the third and fourth switches S3, S4 may define the second phase leg 154.

In the illustrated embodiment, the wireless power supply 110 includes power conditioning circuitry (not shown) capable of conditioning the power received from the AC power source 50. For example, the power conditioning circuitry may be a choke.

The controller 140 may be coupled to one or more components of the wireless power system to achieve operation in accordance with the described functionality and methodology.

II. Control Methodology

Figure 3A:
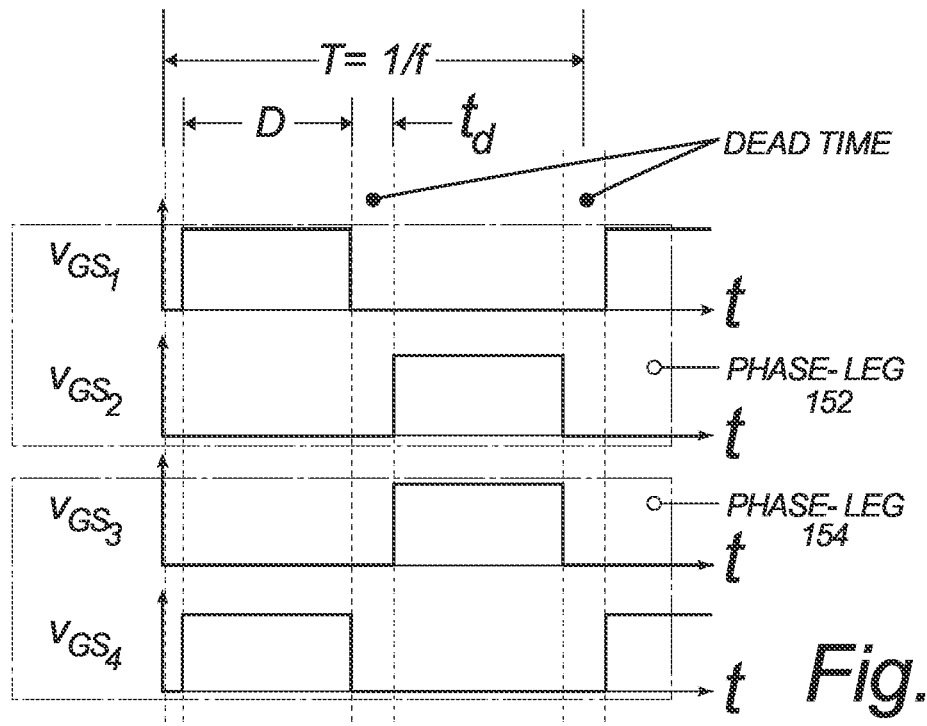
FIG. 3A shows a control cycle for switching circuitry in one embodiment according to the present disclosure.
Figure 3B:
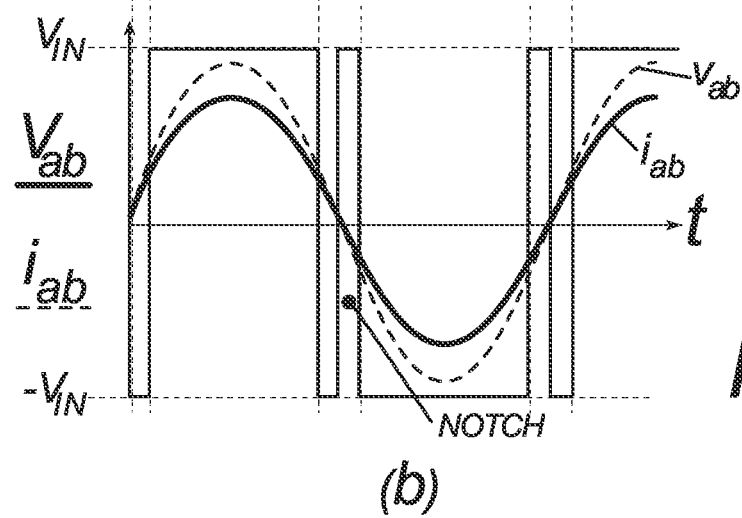
FIG. 3B shows an output of the switching circuitry operated according to the control cycle of FIG. 3A.

The switching pulse applied to the switching circuitry 116 in accordance with one embodiment is shown in FIG. 3A. Specifically, FIG. 3A depicts the gate voltages $V_{GS1}$, $V_{GS2}$, $V_{GS3}$, $V_{GS4}$ applied respectively to the switches S1, S2, S3, S4 for a control cycle T of power supplied from the DC power 150 to the transmitter 112. In FIGS. 3A and 3B, a dead-time, $t_d$ is provided between the complementary switching instances of the first and second phase legs 152, 154 to allow the switches S1, S2, S3, S4 to turn-on or off completely. FIG. 3B depicts the voltage $V_{ab}$ applied to resonant network 111, including the transmitter 112, according to the control cycle T of FIG. 3A, with $i_{ab}$ being the current flowing through resonant network 111 and $v_{ab}$ being the fundamental voltage component of the voltage $V_{ab}$ applied to the resonant network 111. It is noted that current flowing through the transmitter 112 may be affected by presence of a receiver 122 proximal to the transmitter 112. In the series compensation configuration of the illustrated embodiment, the inverter current $i_{ab}$ is equal to the current of the transmitter 112; however, in other types of compensation networks, the inverter current $i_{ab}$ and current of the transmitter 112 may not be the same and therefore the current of the transmitter may be independent of proximity to the receiver.

During this dead-time interval, the switches S1, S2, S3, S4 of both the phase legs 152, 154 are off, and the energy stored in the transmitter circuitry 111 (e.g., resonant tank) discharges through the diodes D1, D2, D3, D4 of the switches S1, S2, S3, S4. However, if the current changes its direction during the dead-time interval, the conduction of the diodes D1, D2, D3, D4 results in a voltage-polarity reversal, also described herein as a notch, that occurs at the output $V_{ab}$ of the switching circuitry 116. The operating conditions of the phase-shift angle, α and the phase-angle, ϕ of the switching circuitry 116 (e.g., inverter circuitry) may be analyzed to confirm the operating regions of the notch occurrence.

In one embodiment, the notches at the output $V_{ab}$ can be avoided if the following notch equation is satisfied.

$$\theta_v = \phi \geq \frac{\psi_{td}}{2} \quad (1)$$

where $\theta_v \in \mathbb{R}^+$ is the angle between the square-wave of the switching circuitry 116 and its fundamental component and is given as $\theta_v = \alpha/2$ for the conventional phase-shift control methodology; $\phi \in \mathbb{R}^+$ is the phase angle between the fundamental component of the voltage and current of the switching circuitry 116; the phase-shift, α, is the phase-difference between the gate-signals of the switches S1, S2, S3, S4; and $\psi_{td}$ is the dead-time angle given by the following:

$$\psi_{td} = 2\pi \times f \times t_d \quad (2)$$

where $t_d$ is the dead-time in seconds and f is the switching frequency in Hertz. The phase-shift, α, is defined such that a 0° phase-shift results in a full-duty cycle and a 180° phase-shift results in a zero-duty cycle at the output of the switching circuitry 116. If the phase-shift between the phase legs 152, 154 is 0° (e.g., α=0°), then the notch equation (1) can be re-written as:

$$|\phi| \geq \frac{\psi_{td}}{2} \quad (3)$$

It can be seen in one embodiment that the notches in the switching circuitry 116 persist if this equation (3) is not satisfied. In other words, by measuring the input phase-angle, coil detecting may be enabled by predicting notches (e.g., distortion) rather than detecting notches.

Figure 4:
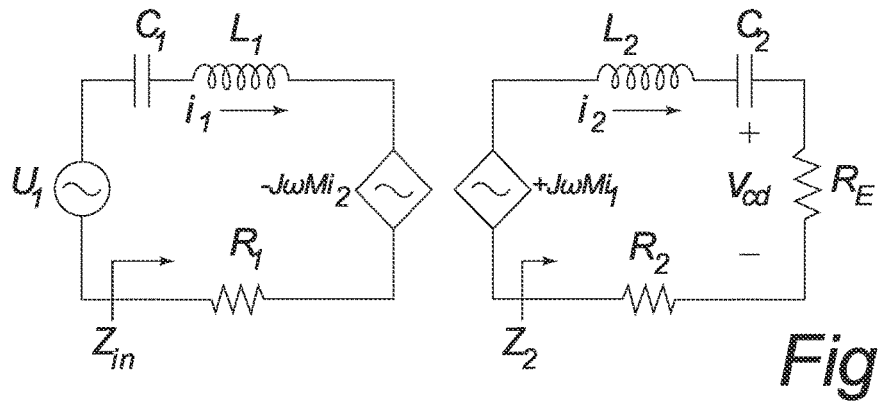
FIG. 4 shows an equivalent circuit of a wireless power system in accordance with one embodiment.

For purposes of discussion, a circuit approximation of the wireless power system 100 is depicted in the illustrated embodiment of FIG. 4. The depicted embodiment corresponds to the first harmonic approximation of a series-series compensated WPT system 100. $L_1$ and $L_2$ are the primary-side and secondary-side self-inductances, respectively, $C_1$ and $C_2$ are the primary-side and secondary-side compensation capacitors 114, 124, $R_1$ and $R_2$ are the series-equivalent resistances of the primary-side and secondary-side coils 111, 122, and M is the mutual inductance between the transmitter and receiver coils such that $M = k\sqrt{L_1 L_2}$, where k is the coupling coefficient, $U_I$ is the fundamental component of the inverter voltage, and $v_{cd}$ is the AC voltage across the load. The AC equivalent resistance at the rectifier input is given as $$R_E = \left(\frac{8}{\pi^2}\right) R_L,$$

where $R_L$ is the DC load resistance connected across the rectifier output. The resonant operating frequency, ω, of the system is given as:

$$\omega = \frac{1}{\sqrt{L_1 C_1}} = \frac{1}{\sqrt{L_2 C_2}} \quad (4)$$

The primary-side and secondary-side impedances are given as:

$$Z_1 = R_1 + jwL_1 + \frac{1}{jwC_1} \quad (5)$$

$$Z_2 = R_2 + jwL_2 + \frac{1}{jwC_2} \quad (6)$$

The impedance at the output of the primary-side inverter is given as:

$$Z_{in} = Z_1 + \frac{w^2 M^2}{Z_2 + R_E} \quad (7)$$

The input phase angle of the system can be calculated as:

$$\phi = \arctan\left[\frac{\text{Im}(Z_{in})}{\text{Re}(Z_{in})}\right] \quad (8)$$

These equations (4-8), as well as the other equations (1-3) described herein can be used to predict the occurrence of notches at the output a-b of the switching circuitry 116 (e.g., the output of the inverter). The reflected impedance at the output a-b of the switching circuitry 116 may vary as a receiver 122 travels along the transmitter 112 (e.g., as the EV travels).

Figure 5A:
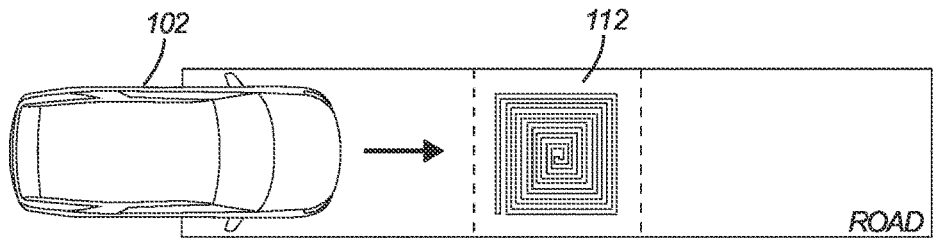
FIG. 5A shows a mutual inductance profile in one embodiment according to the present disclosure.
Figure 5A:
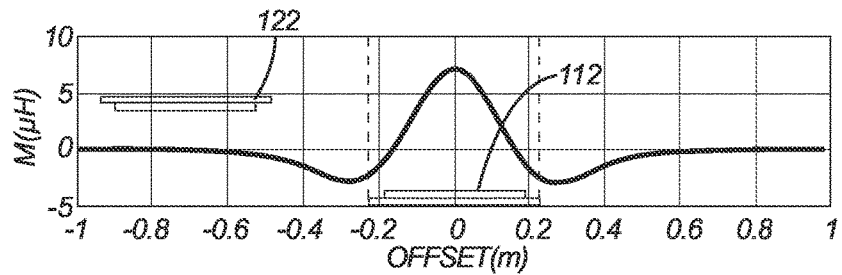
Figure 5B:
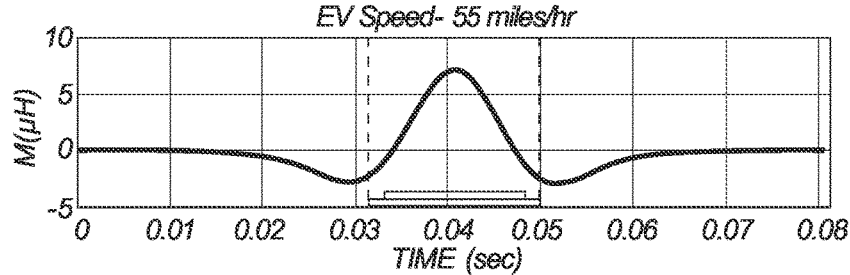
FIG. 5B shows a detection signal for a notch in one embodiment according to the present disclosure.

A mutual inductance profile between the transmitter 112 and the receiver 122 is depicted in FIG. 5A. As can be seen, the mutual inductance between the transmitter 112 and the receiver 122 is maximum with perfect alignment (offset=0), and the mutual inductance reduces as the transmitter 112 and the receiver 122 are misaligned and becomes zero at a threshold distance of about 0.18 m in the illustrated embodiment. If the EV is travelling at a speed of 55 mph, the mutual inductance profile of the transmitter 112 and the receiver 122 as a function of time can be plotted as shown in FIG. 5B.

Figure 5C:
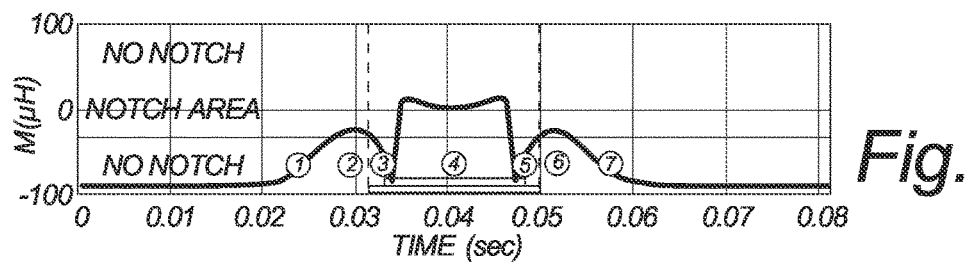
FIG. 5C shows a detection signal for a notch in one embodiment according to the present disclosure.

FIG. 5C depicts the variations in the input phase-angle as the EV travels along the transmitter 112. A "notch area" is identified in FIG. 5C that highlights the occurrence of the notches at the output a-b of the switching circuitry 116. If the input phase angle resides in the notch area, the notches occur in the output a-b of the switching circuitry 116. When the receiver 122 is far away from the transmitter 112, the input phase-angle is outside the notch area, and notches are absent at the output a-b of the switching circuitry 116. As the receiver 122 approaches the transmitter 112, the input phase-angle, $\phi$, between the voltage and current of the output a-b enters the notch area, which depicts the occurrence of notches in the output voltage of the switching circuitry 116. Regions 2, 4, and 6 highlight the presence of notches in the switching circuitry 116. These regions of the notch occurrence at the output a-b of the switching circuitry 116 can be used to determine the arrival of the receiver 122 (including the arrival of the EV).

Furthermore, as can be seen in FIG. 5C, the notches in the switching circuitry 116 occur before the receiver 122 is aligned for power transfer with the transmitter 112. Detection of the notch in the illustrated embodiment occurs prior to alignment of the receiver 122 and the transmitter 112 for a potential charging duration, with the notch being detected in a pre-alignment duration prior to alignment of the transmitter 112 and the receiver 122. For instance, in the illustrated embodiment, the notch can be detected approximately 22 ms prior to perfect alignment (offset=0 m). In one embodiment, the wireless power supply 110 may begin transferring power during this 22 ms period. It is noted that, in the beginning of this duration, the transmitter 112 and the receiver 122 may not be considered aligned for power transfer; however, by beginning transferring of power immediately after detection of the notch, the transmitter 112 and receiver 122 are configured to transfer power during the entire potential power transfer duration.

It is worth noting in FIG. 5C that the variations in the phase angle may depend on the operating frequency, configuration of the compensation network, and sensitivity of the system. Accordingly, the phase angle determinations, as well as the notch criteria, described herein may vary from application to application.

In the illustrated embodiment of FIG. 1, the wireless power system 100 includes a detector 144 operable to detect a characteristic of power of the switching circuitry 116. The detector 144 in the illustrated embodiment may be operable to detect a notch in the output a-b of the switching circuitry 116. For example, the detector 144 may be configured in according to the illustrated embodiment of FIG. 8. The detector 144 may receive the gate signal T1 that controls operation of the switch SW1 (e.g., gate signal T1 is coupled to the gate of switch SW1). A timing signal g3 may be based on logic applied to the signals g1, g2. The timing signal g3 is AND'd with a clock signal Q to yield the notch signal. The signal g2 in the illustrated embodiment may be based on the signal conditioning applied to the gate signal T1.

The signal g3 in the illustrated embodiment is a logic operation with an output of a comparator signal g1, which is based on the voltage $v_{ab}$ of the output a-b of the switching circuitry 116. The voltage $v_{ab}$ may be conditioned by signal conditioning circuitry to yield a signal $v_1'$. Similarly, the gate pulse $T_1$ may be conditioned by signal conditioning circuitry to yield a signal $T_1'$. The signal conditioning circuitry may include a voltage sensor and an operational amplifier to acquire the voltages $v_{ab}$, $T_1$ and reduce the amplitude of the signal for comparison to a reference. In the illustrated embodiment, the signals $v_1'$ is compared to a reference (identified as 0 V in the illustrated embodiment), such that the comparator signal g1 is logic high while the signal $v_1'$ is greater than or equal to the reference and logic low while the signal $v_1'$ is less than the reference.

The timing signal g3 and clock signal Q are AND'd to yield a Notch signal, which is then conditioned by an operational amplifier (e.g., to amplify the Notch signal to increase the voltage level of the Notch signal [increasing its average value or average amplitude]) and a low-pass filter to yield an output signal OUT. Alternatively, the operational amplifier may be arranged after the LPF to yield similar results. This output signal OUT may be provided to the drive circuitry 144 and used as a basis for transitioning from a low-power mode to an operating power mode. Example signals for the detector 144 in the illustrated embodiment of FIG. 8 are depicted in FIG. 9—it is to be understood in the illustrated embodiment of FIG. 9 that $V_{ref}$ and $V_{ref2}$ may or may not be equal.

Figure 8:
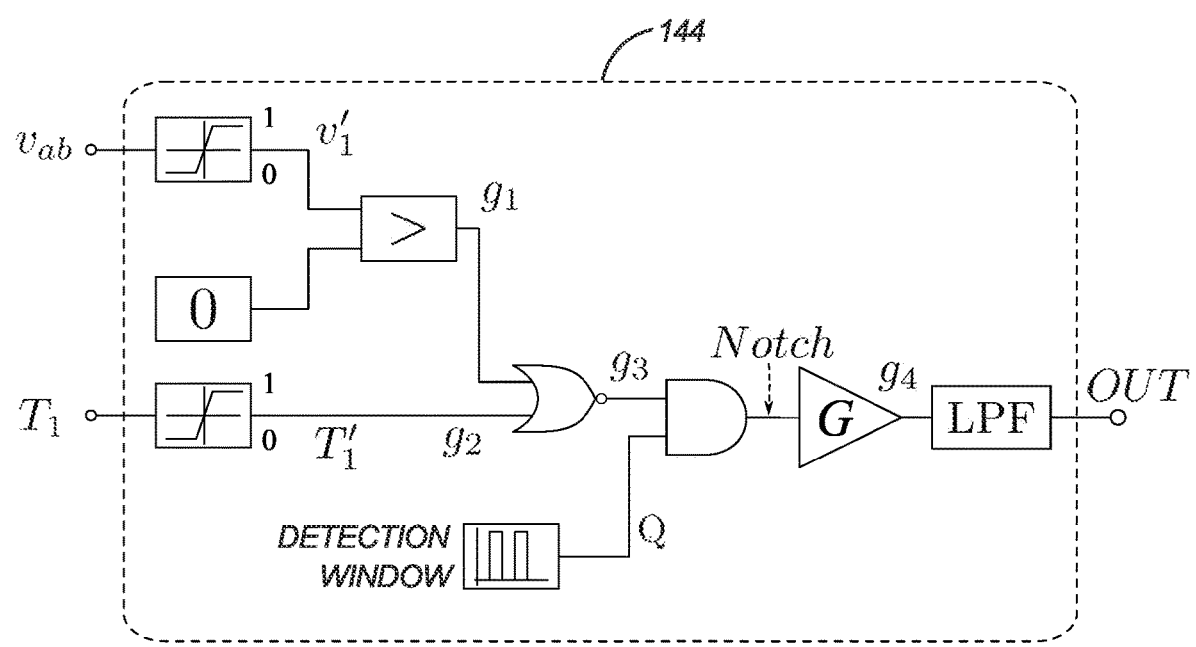
FIG. 8 shows a detection circuit in one embodiment according to the present disclosure.
Figure 9:
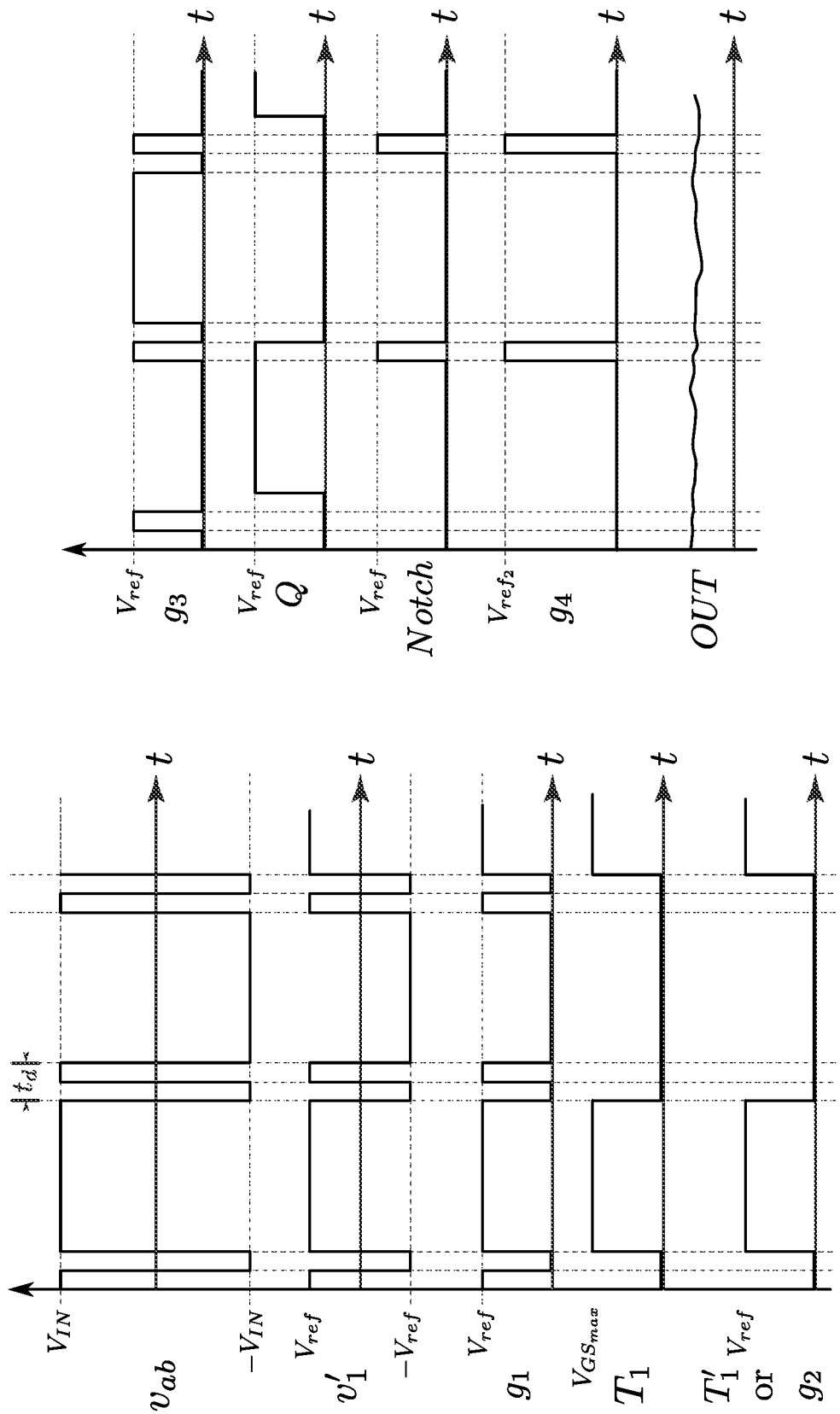
FIG. 9 shows a timing diagram of signals in the detection circuit of FIG. 8 in accordance with one embodiment.

The detector 144 operating as a notch detection circuit in the illustrated embodiment of FIG. 8 may include a combination of logic gates, such as those depicted. Alternatively, the detector 144 may include an op-amp in a different configuration than depicted in FIG. 8 (e.g., without one or more of the logic gates shown in FIG. 8) that can be used to detect the notch. For instance, the op-amp may be configured to provide an analog signal representative of the voltage $v_{ab}$ of the switching circuitry 116. The controller 140 of the drive circuitry 142 may be configured to sample output of the op-amp with sufficient bandwidth to capture a digital form of the analog signal. The controller 140 may be configured to digitally process the sampled signal to yield an output signal OUT similar to the circuitry of FIG. 8.

Figure 7:
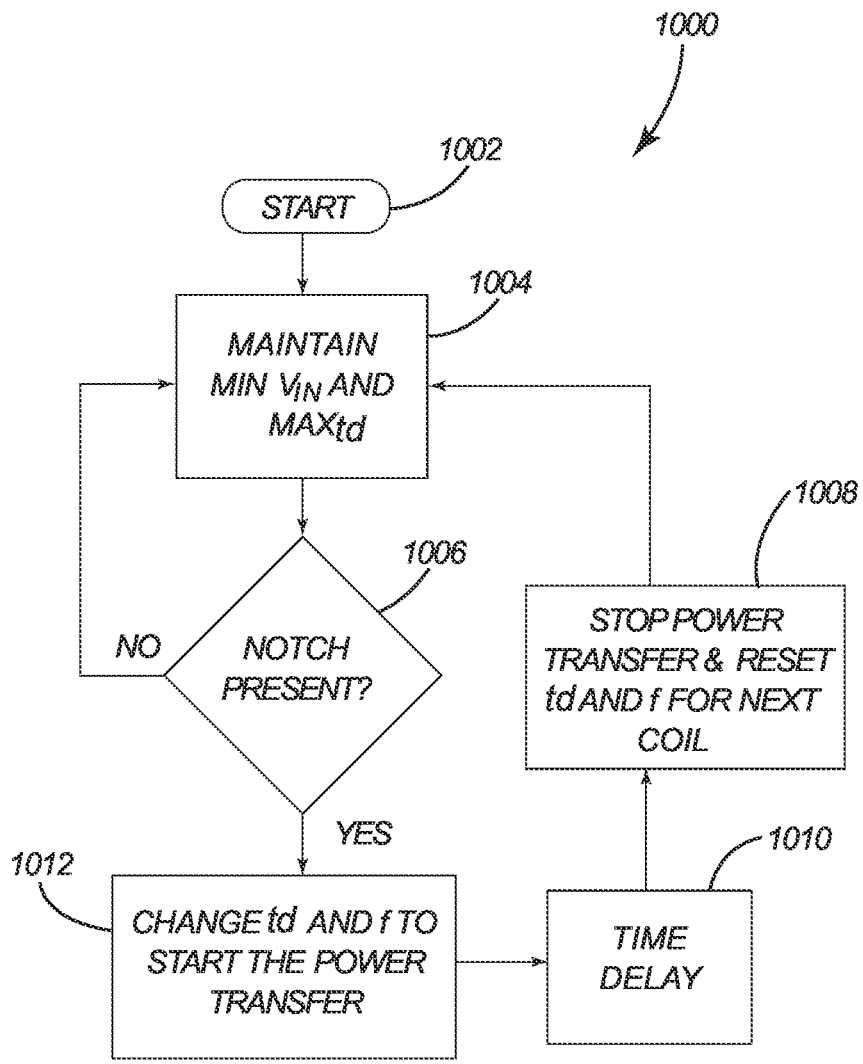
FIG. 7 shows a method in one embodiment according the present disclosure.

A method of detecting a receiver 122 in proximity to the transmitter 112 in accordance with one embodiment is depicted in FIG. 7 and generally designated 1000. The detailed coil detection algorithm is depicted in FIG. 7. In operation, the input DC link voltage or DC source 150, VIN, may be maintained at a low value (optionally, a minimum value) for low-power operation, and switching frequency of the switching circuitry 116 may be maintained at a predetermined frequency to achieve a target system response, such as the system response depicted in FIG. 5C. Steps 1002, 1004. The phase-shift may be maintained such that $\alpha=0°$. The dead-time between the complementary switching instance may be set to a maximum value to increase the detection range; however, equation (3) may be satisfied when the receiver 122 is not near the proximity of transmitter 112. If the receiver 122 does not approach the transmitter 112, then VIM is maintained at the low value (optionally, a minimum value) for the low power mode.

When the receiver 122 approaches the transmitter 112, the reflected impedance at the primary side of the WPT system 100 varies and the input phase angle, $\phi$, approaches a near-zero value. When the value of the phase angle, $\phi$, is <$\psi_{td}/2$, the notches/distortions may start to appear at the output a-b of the switching circuitry 116. These notches may be detected by the detector 144, which indicates the arrival of the receiver 122. Step 1006.

In response to detection of the notches, reset the dead-time to the minimum value, change the operating frequency to eliminate the notches during normal operation, and increase the voltage of the DC source 150 via control of the power control circuitry 118. Step 1012. This increase in voltage may correspond to transition from the low-power mode to an operating power mode for power transfer to the receiver 122. The increase in voltage may facilitate transferring the rated power for a predefined time delay (typically based on the speed of the EV)

After the preset time delay, the voltage of the DC source 150, the operating frequency, and the dead-time values may be reset to the initial condition—e.g., set to the low-power mode—to detect the arrival of the next receiver 122. Steps 1010, 1008.

The method 1000 may be operable to activate the power transfer (e.g., operating power mode) only when the notches appear at the output a-b of the switching circuitry 116. Non-resonant objects (such as the EV chassis) may not significantly vary the phase-angle, ϕ; consequently, the possibility of false detection of the EV may be avoided with the described methodology. Moreover, the system standby losses may be reduced by maintaining the voltage of the DC source 150 (e.g., the DC link voltage) at the low value (optionally a minimum value). An example low value for the voltage of the DC source 150 in the low power mode is in the tens of volts (e.g., 100 W), whereas the voltage during the operating power mode may be approximately 10 kW. The standby loss may vary depending on the design of the WPT system 100, and could be reduced. However, if the standby loss power is compared with the rated power, e.g., 10 kW then a 100 W standby loss would correspond to approximately 1%. Moreover, for 100 kW rated power transfer, a 100 W to 200 W standby loss would correspond to <1%.

For purposes of disclosure, power transfer is described in conjunction with the method 1000; in practice, additional control methodologies may be implemented, such as input power factor correction, which may be used to vary the voltage of the DC power 150.

The method 1000 may be validated in an open-loop configuration with a series-series compensated WPT system 100. The self-inductance of the transmitter 112 and receiver 122 and the mutual inductance may be varied using a look-up such that a change in the values represent an EV travelling at 55 mph. A detector 144 in this validation example may include combinational logic gates and a low pass filter.

The mutual inductance profile of the validation setup may be similar to the profile depicted in FIG. 5A. For this setup, FIG. 5C depicts the output of the detector 144, which may detect the EV at about 30 ms when the receiver 122 is approaching alignment or starts to align with the transmitter 112. FIGS. 6A-B shows the waveforms of the switching circuitry 116 for various regions of the receiver 122 relative to the transmitter 112, which compile the notch occurrence at different time intervals along the travel of the receiver 122 (e.g., travel of the EV). The notches in the waveforms occur in regions 2, 4, and 6. Thus, the notches at the output a-b of the switching circuitry 116 can be exploited to detect the arrival of the EV. Moreover, it is noted that the notches at the output a-b of the switching circuitry 116 may have a very low excitation voltage, such as a voltage of about +/−50 V.

A signal processed by the detector 144 may appear similar to the signal of FIG. 5C, but at a voltage less than 50V. The excitation voltage may be increased or decreased based on the type of power modules and the value of actual gate voltage (often between −2V to +18 V).

The low voltage excitation of the switching circuitry 116 in the low-power mode may reduce the standby losses. Because the method 1000 described herein may be accomplished by monitoring the voltage $v_{ab}$ of the output a-b of the switching circuitry 116, a control strategy can be suitable for both long track and segmented track configurations 200, 250. Furthermore, the detector 144 is operable to detect the receiver 122 without the use of sensing coils; therefore, a segmented track with only one inverter may significantly reduce the component count as compared to conventional systems with sensing coils.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. An off-board transmitter for wirelessly providing AC power to an electric vehicle (EV) or a plug-in electric vehicle (PEV), the transmitter comprising:
   a DC voltage source;
   an inverter configured:
     to receive a DC voltage from the DC voltage source, and
     convert the DC voltage to a high-frequency AC voltage;
   a primary coil configured to wirelessly transmit the high-frequency AC voltage;
   a notch detector configured to:
     sense the high-frequency AC voltage as a sensing signal, and detect notches in the sensing signal caused by varying coupling between the primary coil and a pick-up coil of the EV/PEV, the pick-up coil configured to receive the high-frequency AC voltage when the primary coil and the pick-up coil are disposed adjacent to each other; and driver circuitry configured to:
   apply first driving signals to the inverter such that a first deadtime is provided between complementary switching instances of the inverter phase legs, and set a level of operating frequency, provided by the drive signal, to a first level, and set a level of the DC voltage, provided by the DC voltage source to the inverter, to a first level;
   monitor the notch detector to determine whether notches have been detected, and if so, generate second driving signals corresponding to a second deadtime shorter than the first deadtime, and set the level of the frequency to a second level, and set the level of the DC voltage to a second level larger than the first level, and after a predetermined time interval, regenerate the first driving signals, and reset the level of the DC voltage to the first level.

2. The transmitter of claim 1, wherein the notch detector comprises an operational amplifier.

3. The transmitter of claim 1, wherein a frequency of the fundamental component of the high-frequency AC voltage is 22 kHz or 85 kHz.

4. The transmitter of claim 1, wherein the driver circuitry comprises a microcontroller, an ASIC, or an FPGA.

5. A wireless power transfer (WPT) system for wirelessly providing AC power to an electric vehicle or a plug-in electric vehicle, the WPT system comprising:
   the off-board transmitter of claim 1; and
   an on-board receiver comprising a pick-up coil.

6. The WPT system of claim 5, for which:
   a WPT system power rating of 100 kW, and
   the second level of the DC voltage is in a voltage range of 350-800 V.

7. The WPT system of claim 6, wherein the first level of the DC voltage is in a voltage range of 5-50V.

\* \* \* \* \*